(12) United States Patent
Hori et al.

(10) Patent No.: US 11,798,417 B2
(45) Date of Patent: Oct. 24, 2023

(54) DRIVING ASSISTANCE DEVICE

(71) Applicants: DENSO CORPORATION, Kariya (JP); TOYOTA JIDOSHA KABUSHIKI KAISHA, Toyota (JP)

(72) Inventors: Hiroki Hori, Kariya (JP); Takayuki Kitamura, Kariya (JP); Koji Takeuchi, Toyota (JP); Iwao Izumikawa, Toyota (JP); Hiroki Shimazu, Nisshin (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 213 days.

(21) Appl. No.: 17/357,742

(22) Filed: Jun. 24, 2021

(65) Prior Publication Data

US 2021/0327274 A1  Oct. 21, 2021

Related U.S. Application Data

(63) Continuation of application No. PCT/JP2019/049629, filed on Dec. 18, 2019.

(30) Foreign Application Priority Data

Dec. 27, 2018 (JP) ................ 2018-245839

(51) Int. Cl.
*G01S 13/931* (2020.01)
*G08G 1/16* (2006.01)
(Continued)

(52) U.S. Cl.
CPC ............ *G08G 1/16* (2013.01); *B60Q 9/008* (2013.01); *G01S 13/931* (2013.01); *G01S 15/931* (2013.01); *G01S 17/931* (2020.01)

(58) Field of Classification Search
CPC ........ G08G 1/16; G01S 17/931; G01S 13/931
See application file for complete search history.

(56) References Cited

U.S. PATENT DOCUMENTS

| 6,323,802 B1 * | 11/2001 | Tokoro .................. G01S 13/931 342/70 |
| 2010/0214153 A1 * | 8/2010 | Kikuchi ................ G01S 7/2921 342/70 |
| 2020/0031341 A1 | 1/2020 | Kitamura et al. | |

FOREIGN PATENT DOCUMENTS

| JP | 2000-147115 A | 5/2000 |
| JP | 2007-091102 A | 4/2007 |

(Continued)

*Primary Examiner* — Benyam Haile
(74) *Attorney, Agent, or Firm* — MASCHOFF BRENNAN

(57) ABSTRACT

A driving assistance device includes an object detection unit, an acquisition unit acquiring a first value of a relative speed of an approaching object with respect to an own vehicle, a ghost determination unit, and an assistance determination unit. The ghost determination unit calculates a second value of the relative speed of the approaching object in accordance with a speed of the own vehicle and a value of the relative speed of a following object located between the own vehicle and the approaching object; calculates, as a speed difference, an absolute difference between the first value of the relative speed and the second value of the relative speed; calculates, as an azimuth difference, an absolute difference between an azimuth of the following object and an azimuth of the approaching object; and determines whether the approaching object is the ghost target based on the speed difference and the azimuth difference.

4 Claims, 4 Drawing Sheets

(51) Int. Cl.
    *G01S 17/931* (2020.01)
    *B60Q 9/00* (2006.01)
    *G01S 15/931* (2020.01)

(56) References Cited

FOREIGN PATENT DOCUMENTS

| JP | 2007-148618 A | 6/2007 |
| JP | 2014-071012 A | 4/2014 |
| JP | 2018-055451 A | 4/2018 |

* cited by examiner

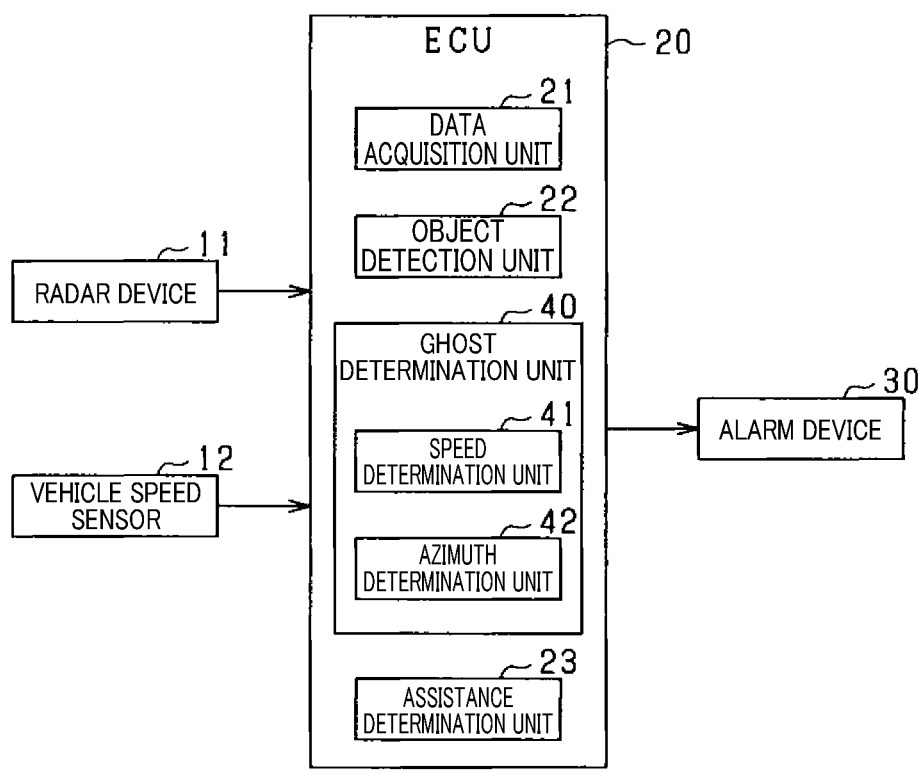

FIG.3
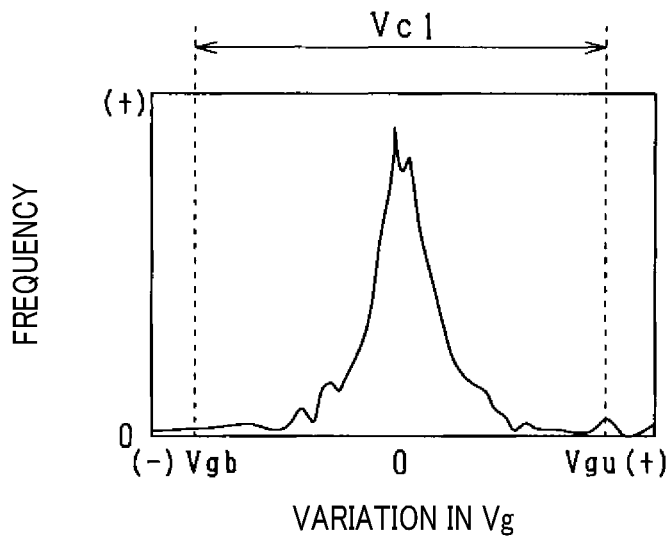
FIG.4
| $\theta c$ | $Vs < Vc2$ | $Vs \geq Vc2$ |
|---|---|---|
| | $\theta c1$ | $\theta c2 (R < Rc1)$ <br> $\theta c3 (Rc1 \leq R < Rc2)$ <br> $\theta c4 (Rc2 \leq R < Rc3)$ <br> $\theta c5 (Rc3 \leq R)$ |
FIG.5
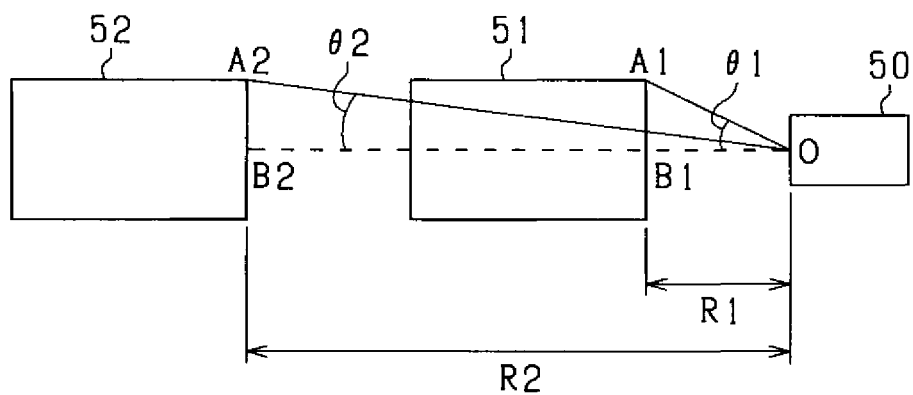

DRIVING ASSISTANCE DEVICE

CROSS-REFERENCE TO RELATED APPLICATION

The present application is a continuation application of International Application No. PCT/JP2019/049629, filed on Dec. 18, 2019, which claims priority to Japanese Patent Application No. 2018-245839, filed on Dec. 27, 2018. The contents of these applications are incorporated herein by reference in their entirety.

BACKGROUND

Technical Field

The present disclosure relates to a driving assistance device that performs driving assistance based on object detection information on an object behind a vehicle.

Background Art

A system that transmits electromagnetic waves toward the front of the own vehicle and receives reflected waves resulting from the electromagnetic waves to detect another vehicle approaching the own vehicle and perform notification is known. When, for example, the own vehicle travels in a closed space such as under a viaduct or in a tunnel, and reflected waves from another vehicle are further reflected by a road structure, in some cases, an object (ghost object) that is not actually present is detected. In Patent Literature 1, when it is determined that an object detected by using reflected waves is a ghost object, the ghost object is excluded from being an object for which notification is to be performed.

SUMMARY

In the present disclosure, provided is a driving assistance device as the following.

The driving assistance device includes an object detection unit, an acquisition unit, a ghost determination unit, and an assistance determination unit. The acquisition unit is configured to acquire a first value of a relative speed of an approaching object with respect to an own vehicle. The ghost determination unit is configured to: calculate a second value of the relative speed of the approaching object with respect to the own vehicle in accordance with a speed of the own vehicle and a value of the relative speed of a following object with respect to the own vehicle, the following object being located between the own vehicle and the approaching object; calculate, as a speed difference, an absolute difference between the first value of the relative speed of the approaching object and the second value of the relative speed of the approaching object; calculate, as an azimuth difference, an absolute difference between an azimuth of the following object and an azimuth of the approaching object; and determine whether the approaching object is the ghost target based on the speed difference and the azimuth difference.

BRIEF DESCRIPTION OF THE DRAWINGS

The above object and other objects, features, and advantages of the present disclosure will be more apparent from the following detailed description with reference to the accompanying drawings, wherein:

FIG. 1 shows a driving assistance system according to an embodiment;

FIG. 3 is a frequency distribution diagram for a relative speed of a ghost target;

FIG. 4 shows an example of an azimuth difference threshold set based on an own vehicle speed Vs and a distance R between a following vehicle and the own vehicle;

FIG. 5 is a diagram showing setting of the azimuth difference threshold based on the distance R between the following vehicle and the own vehicle;

DETAILED DESCRIPTION OF THE PREFERRED EMBODIMENTS

[PTL 1] JP 2014-71012 A

Figure 2A:
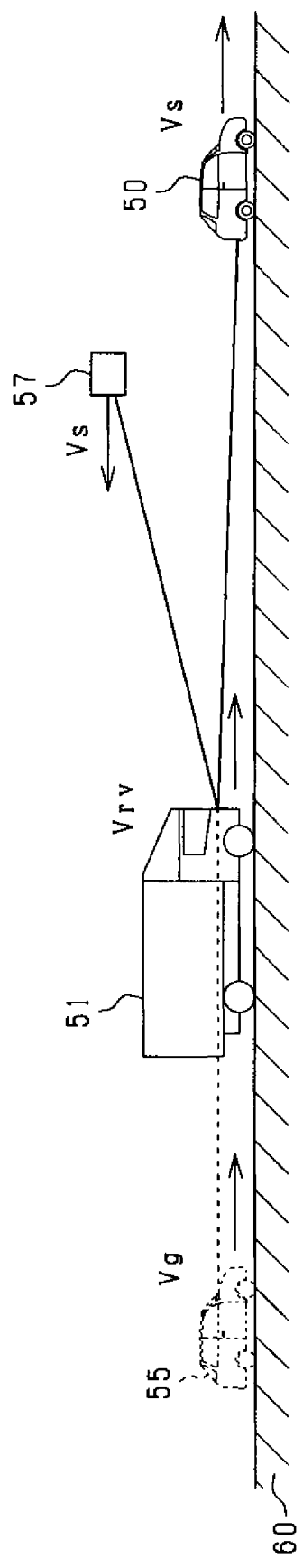
FIG. 2A and FIG. 2B shows a speed condition and an azimuth condition in ghost determination according to the embodiment.

Patent Literature 1 describes a technique for the purpose of reliably excluding a ghost object that is difficult to determine, but does not describe a technique for preventing an actual approaching object from being erroneously determined to be a ghost object. If an actual approaching object is erroneously determined to be a ghost object and no notification is performed, traveling safety of the own vehicle cannot be ensured.

In view of the above, an object of the present disclosure is to provide a driving assistance device capable of distinguishing between an actual approaching object and a ghost object with higher accuracy.

A driving assistance device provided in the present disclosure includes: an object detection unit that detects one or more objects behind an own vehicle by using a reflected wave resulting from a search wave, and recognizes, in the detected one or more objects, an object that is approaching the own vehicle as an approaching object; an acquisition unit that acquires a speed of the own vehicle, and a relative speed and an azimuth of each of the one or more objects detected by the object detection unit with respect to the own vehicle; a ghost determination unit that determines whether the approaching object is a ghost target that is not actually present; and an assistance determination unit that performs driving assistance of the own vehicle for danger avoidance of the own vehicle from a target object, and excludes, from the target object, the approaching object determined to be the ghost target by the ghost determination unit, wherein the acquisition unit is configured to acquire a first value of the relative speed of the approaching object with respect to the own vehicle; the ghost determination unit is configured to: calculate a second value of the relative speed of the approaching object with respect to the own vehicle in accordance with the speed of the own vehicle and a value of the relative speed of a following object with respect to the own vehicle, the following object being detected by the object detection unit and being located between the own vehicle and the approaching object; calculate, as a speed difference, an absolute difference between the first value of the relative speed of the approaching object and the second value of the relative speed of the approaching object; calculate, as an azimuth difference, an absolute difference between an azimuth of the following object and an azimuth of the approaching object acquired by the acquisition unit; and determine whether the approaching object is the ghost target based on the speed difference and the azimuth difference.

According to the present disclosure, the acquisition unit is configured to acquire a first value of the relative speed of the approaching object with respect to the own vehicle. The ghost determination unit is configured to calculate a second value of the relative speed of the approaching object with respect to the own vehicle in accordance with the speed of the own vehicle and a value of the relative speed of a following object with respect to the own vehicle, the following object being detected by the object detection unit and being located between the own vehicle and the approaching object; and calculate, as a speed difference, an absolute difference between the first value of the relative speed of the approaching object and the second value of the relative speed of the approaching object. Furthermore, the ghost determination unit is configured to calculate, as an azimuth difference, an absolute difference between an azimuth of the following object and an azimuth of the approaching object acquired by the acquisition unit. Then, the ghost determination unit is configured to determine whether the approaching object is the ghost target based on the speed difference and the azimuth difference. The ghost determination unit calculates, as a speed difference, an absolute difference between a detected relative speed of an approaching object and a relative speed of the approaching object that is theoretically obtained by assuming that the approaching object is a ghost target, and calculates, as an azimuth difference, an absolute difference between an azimuth of the detected approaching object and an azimuth of the approaching object that is theoretically obtained by assuming that the approaching object is a ghost target. Then, based on both the speed difference and the azimuth difference, the ghost determination unit determines whether the approaching object is a ghost target. Thus, it is possible to distinguish between an actual approaching object and a ghost object with higher accuracy.

First Embodiment

As shown in FIG. 1, a driving assistance system 10 according to an embodiment includes a radar device 11, a vehicle speed sensor 12, an ECU 20, and an alarm device 30.

The radar device 11 is, for example, a known millimeter wave radar that transmits a high-frequency signal in a millimeter wave band. The own vehicle may be provided with only a single radar device 11 or a plurality of radar devices 11. The radar device 11 is provided, for example, at a rear end portion or the like of the own vehicle, sets a region in a predetermined detection angle range as a detection region in which object detection can be performed, and detects a position of an object in the detection region.

Specifically, the radar device 11 transmits search waves in a predetermined cycle, and receives reflected waves resulting from search waves using a plurality of antennas. A distance to an object can be calculated from a time at which the search waves are transmitted and a time at which the reflected waves are received.

Furthermore, a relative speed is calculated from a frequency of the reflected waves reflected by the object that is changed by the Doppler effect. In addition, an azimuth of the object can be calculated from a phase difference between the reflected waves received by the plurality of antennas. When the position and azimuth of an object can be calculated, a relative position of the object with respect to the own vehicle can be specified.

The radar device 11 is an example of a surrounding monitoring device that transmits search waves, detects reflected waves obtained by the search waves being reflected by an object around the own vehicle, and acquires information on the surroundings of the own vehicle. As the surrounding monitoring device using search waves, in addition to the radar device 11, the driving assistance system 10 may include an ultrasonic sensor, a LIDAR (light detection and ranging/laser imaging detection and ranging), and the like.

A sensor transmitting search waves such as a millimeter wave radar like the radar device 11, a sonar, or a LIDAR sequentially outputs, as sensing information to the ECU 20, a scanning result based on a reception signal obtained when the sensor receives reflected waves reflected by an obstacle.

The vehicle speed sensor 12 is a sensor that detects a traveling speed of the own vehicle, and is not limited and may be use, for example, a wheel speed sensor capable of detecting a rotational speed of a wheel. The wheel speed sensor used as the vehicle speed sensor 12 is attached to, for example, a portion of the wheel that is not a tire, and outputs a wheel speed signal corresponding to the wheel speed of the vehicle to the ECU 20.

The driving assistance system 10 may further include various sensors such as an imaging device, a steering angle sensor, a yaw rate sensor, and a GNSS (global navigation satellite system) receiver such as a GPS receiver. The ECU 20 may be able to acquire a detection signal of such sensors.

The alarm device 30 is a device for providing a notification to a driver or the like, and may be, for example, a device that provides an audible notification such as a loudspeaker or a buzzer, or a device that provides a visual notification such as a display, provided in a cabin of the own vehicle, but the alarm device 30 is not limited to such a device. The alarm device 30 emits an alarm sound or the like based on a control command from the ECU 20, for example, to notify the driver that there is a risk of a collision with an object.

The ECU 20 includes a data acquisition unit 21, an object detection unit 22, an assistance determination unit 23, and a ghost determination unit 40. The ECU 20 includes a CPU, a ROM, a RAM, an I/O, and the like, and implements each of the functions of the above units by using the CPU to execute a program installed in the ROM. Thus, based on information acquired from various sensors such as the radar device 11 and the vehicle speed sensor 12, the ECU 20 generates a control command to the alarm device 30 and outputs the control command, thereby functioning as a driving assistance device that performs driving assistance of the own vehicle.

The data acquisition unit 21 acquires a relative speed and an azimuth of an object with respect to the own vehicle from the radar device 11. Furthermore, the data acquisition unit 21 acquires a traveling speed of the own vehicle from the vehicle speed sensor 12.

The object detection unit 22 detects an object behind the own vehicle from detection information on reflected waves received by the radar device 11. A type of the object is not particularly limited and may include any of a vehicle, a bicycle, a motorcycle, a pedestrian, an animal, a structure, and the like, and may be a moving object or a stationary object. When the ECU 20 includes a surrounding monitoring device other than the radar device 11, such as an imaging device, the surrounding monitoring device may be used in combination with the radar device 11 to detect an object. Furthermore, from the detected objects, the object detection unit 22 recognizes an approaching object that is approaching the own vehicle. The object detection unit 22 can determine whether an object is an approaching object by using a relative speed of the object with respect to the own vehicle.

The ghost determination unit 40 determines whether an approaching object detected as an object approaching the own vehicle by the object detection unit 22 is a ghost target that is not actually present. The ghost determination unit 40 includes a speed determination unit 41 and an azimuth determination unit 42. The speed determination unit 41 determines whether a speed condition for a ghost target is satisfied. The speed condition is a condition that a difference between a relative speed of a detected approaching object and a relative speed of the approaching object that is theoretically obtained by assuming that the approaching object is a ghost target is in a predetermined range. The azimuth determination unit 42 determines whether an azimuth condition for a ghost target is satisfied. The azimuth condition is a condition that a difference between an azimuth of a detected approaching object and an azimuth of the approaching object that is theoretically obtained by assuming that the approaching object is a ghost target is in a predetermined range. When an approaching object detected by the object detection unit 22 satisfies both the speed condition and the azimuth condition for a ghost target, the ghost determination unit 40 determines that the detected approaching object is a ghost target.

Figure 2B:
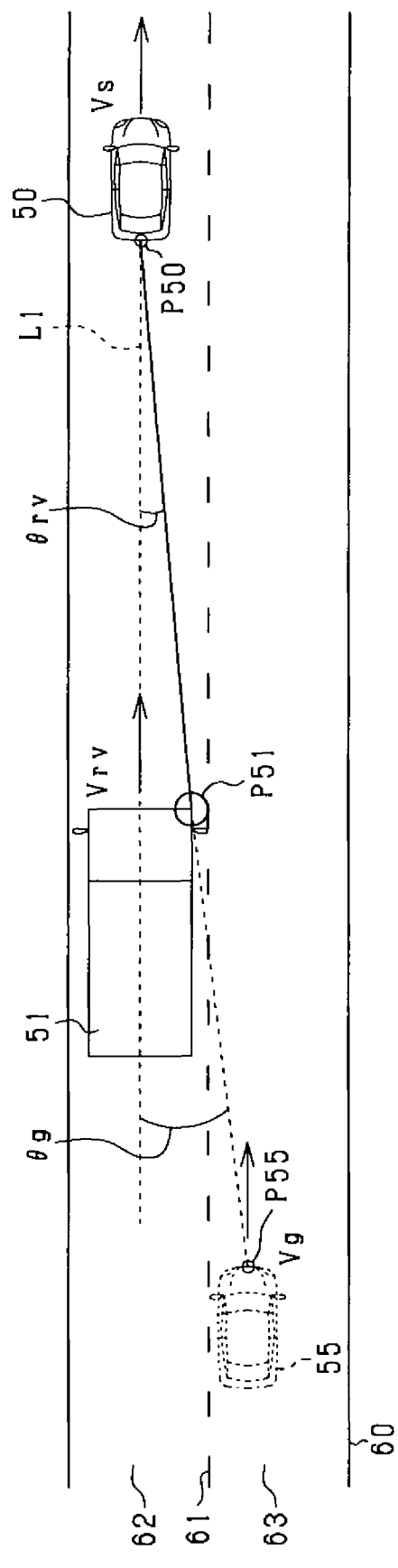

A process performed by the ghost determination unit 40 will be described with reference to FIG. 2. As shown in FIG. 2, an own vehicle 50 and a following vehicle 51 are traveling on a road 60. In the middle of the road 60, a lane marking 61 is provided, and part of the road 60 on the left side of the lane marking 61 is a lane 62, and part of the road 60 on the right side of the lane marking 61 is a lane 63. A road structure 57 is present between the own vehicle 50 and the following vehicle 51. The road structure 57 is, for example, a structure provided on the road such as a road sign, a metal structure such like a tunnel ceiling, or a signboard. FIG. 2A shows the own vehicle 50 and the like viewed from the right side, and FIG. 2B shows the own vehicle 50 viewed from above.

The own vehicle 50 is traveling forward in the lane 62 at an own vehicle speed Vs which is a speed (ground speed) of the own vehicle 50 relative to the road 60. The own vehicle speed Vs is detected by the vehicle speed sensor 12 and acquired by the data acquisition unit 21.

The following vehicle 51 is a vehicle that is traveling immediately behind the own vehicle 50, and is an example of a following object that follows the own vehicle 50. The following vehicle 51 is traveling behind the own vehicle 50 in the same direction as the own vehicle 50 in the lane 62 in which the own vehicle 50 is traveling. A relative speed of the following vehicle 51 with respect to the own vehicle 50 is expressed as Vrv, and is detected by the radar device 11 and acquired by the data acquisition unit 21.

When search waves transmitted backward from the radar device 11 provided at a rear end position P50 of the own vehicle 50 is reflected at a detection point P51 located at a front portion of the following vehicle 51 and is also further reflected by the road structure 57, because of reflected waves due to the above reflection, the object detection unit 22 of the own vehicle 50 detects an approaching object 55 as a ghost target. The approaching object 55 is detected at a position further behind the following vehicle 51.

A relative speed Vg0 (calculated value) of the approaching object 55 with respect to the own vehicle 50 when the approaching object 55 is assumed to be a ghost target can be calculated by the following formula (1) using the relative speed Vrv of the following vehicle 51 with respect to the own vehicle 50, and the own vehicle speed Vs.

$$Vg0 = Vs + 2Vrv \quad (1)$$

On the other hand, the data acquisition unit 21 acquires a relative speed Vg of the approaching object 55 detected by the object detection unit 22 with respect to the own vehicle 50 from the radar device 11. The speed determination unit 41 calculates, as a speed difference dVg, an absolute difference between the relative speed Vg (detected value) of the approaching object 55 with respect to the own vehicle and the calculated value Vg0 based on the following formula (2).

$$dVg = |Vg - Vg0| = |Vg - (Vs + 2Vrv)| \quad (2)$$

As dVg becomes smaller, the relative speed Vg of the approaching object 55 with respect to the own vehicle 50 becomes closer to the calculated value Vg0. The speed determination unit 41 sets a predetermined speed difference threshold Vc1, and determines whether the speed difference dVg is less than the speed difference threshold Vc1. When dVg<Vc1, the speed determination unit 41 determines that the approaching object 55 satisfies the speed condition for a ghost target. When dVg≥Vc1, the speed determination unit 41 determines that the approaching object 55 does not satisfy the speed condition for a ghost target.

Ease of detection of a ghost target has a trade-off relationship with prevention of an erroneous determination in which a real approaching object is erroneously determined to be a ghost target. When Vc1 is set to a large value, a ghost target is easily detected, but there is a high probability that a real approaching object (an approaching object that is actually present) is erroneously determined to be a ghost target. When Vc1 is set to a small value, there is a low probability that a real approaching object is erroneously determined to be a ghost target, but a ghost target is less easily detected. The value of Vc1 may be set, for example, based on detection accuracy of the sensors mounted on the own vehicle 50 such as the radar device 11 and the vehicle speed sensor 12.

The speed difference threshold Vc1 may be set based on an actual measured value. For example, the speed difference threshold Vc1 may be set to include a predetermined proportion of a set of many relative speeds Vg acquired from the radar device 11 by the data acquisition unit 21.

More specifically, for example, as shown in FIG. 3, a frequency distribution diagram is prepared in which the horizontal axis represents variation in the relative speed Vg and the vertical axis represents a frequency of the relative speed Vg. Then, an upper limit standard value Vgu and a lower limit standard value Vgb are set so that a predetermined proportion (e.g., 95%) of the entire set of relative speeds Vg is included and the median value (a position at which the value on the horizontal axis is zero) of the relative speeds Vg is set at the center. By setting a difference between the upper limit standard value Vgu and the lower limit standard value Vgb as Vc1, the speed difference threshold Vc1 can be set to include a predetermined proportion (e.g., 95%) of relative speeds Vg. The proportion may be changed based on the surrounding environment in which the own vehicle 50 travels, the traveling state of the own vehicle 50, or the like.

As shown in FIG. 2B, when search waves from the radar device 11 provided at the rear end position P50 of the own vehicle 50 is reflected at the detection point P51 located at the right front end of the following vehicle 51, the approaching object 55 detected as a ghost target is detected at a position of a detection point P55 located on the rear right side of the following vehicle 51.

An azimuth θrv of the following vehicle 51 with respect to the own vehicle 50 and an azimuth θg of the approaching object 55 with respect to the own vehicle 50 are acquired from the radar device 11 by the data acquisition unit 21. The azimuth θrv is detected as an angle formed by an own vehicle center axis L1 which is a center axis in the lateral direction of the own vehicle 50 and a line segment connecting the rear end position P50 and the detection point P51. The azimuth θg is detected as an angle formed by the own vehicle center axis L1 and a line segment connecting the rear end position P50 and the detection point P55.

The azimuth determination unit 42 calculates, as an azimuth difference dθg, an absolute difference between the azimuth θrv of the following vehicle 51 with respect to the own vehicle 50 and the azimuth θg of the approaching object 55 with respect to the own vehicle 50 based on the following formula (3).

$$d\theta g = |\theta rv - \theta g| \quad (3)$$

When the approaching object 55 is a ghost target, the detection point P55 of the approaching object 55 is located on the line segment connecting the rear end position P50 and the detection point P51; thus, dθg=0. The azimuth determination unit 42 sets a predetermined azimuth difference threshold θc, and determines whether the azimuth difference dθg is less than the azimuth difference threshold θc. When dθg<θc, the azimuth determination unit 42 determines that the approaching object 55 satisfies the azimuth condition for a ghost target. When dθg≥θc, the azimuth determination unit 42 determines that the approaching object 55 does not satisfy the speed condition for a ghost target.

When θc is set to a large value, a ghost target is easily detected, but there is a high probability that a real approaching object is erroneously determined to be a ghost target. When θc is set to a small value, there is a low probability that a real approaching object is erroneously determined to be a ghost target, but a ghost target is less easily detected. The value of θc may be set, for example, based on detection accuracy of the sensors mounted on the own vehicle 50 such as the radar device 11 and the vehicle speed sensor 12.

The azimuth determination unit 42 may change the azimuth difference threshold θc based on the own vehicle speed Vs or a distance R between the own vehicle 50 and the following vehicle 51. For example, as shown in FIG. 4, when the own vehicle speed Vs is less than a predetermined own vehicle speed threshold Vc2, the azimuth determination unit 42 sets the azimuth difference threshold θc to a predetermined fixed value θc1. When the own vehicle speed Vs is more than or equal to the predetermined own vehicle speed threshold Vc2, the azimuth determination unit 42 changes the azimuth difference threshold θc according to the distance R between the own vehicle 50 and the following vehicle 51. More specifically, the azimuth determination unit 42 sets the azimuth difference threshold θc to be smaller as the distance R between the own vehicle 50 and the following vehicle 51 becomes larger. In FIG. 4, a magnitude relationship between distance thresholds Rc1 to Rc3 for the distance R is Rc1<Rc2<Rc3. Furthermore, a magnitude relationship between predetermined fixed values θc1 to θc5 for the azimuth difference threshold θc is θc1<θc5<θc4<θc3<θc2.

The distance R can be calculated, for example, from detection information acquired from the radar device 11. Specifically, the radar device 11 transmits search waves in a predetermined cycle, and receives reflected waves by the plurality of antennas. A distance to an object can be calculated from a time at which the search waves is transmitted and a time at which the reflected waves is received.

In the method of setting the azimuth difference threshold θc shown in FIG. 4, an approaching object speed Vgr which is a speed (ground speed) of the approaching object 55 relative to the road 60 is estimated by using the own vehicle speed Vs, and the probability that the approaching object 55 is a ghost target is estimated based on the approaching object speed Vgr to set the azimuth difference threshold θc. Based on the formula (1), the approaching object speed Vgr can be calculated by the following formula (4).

$$Vgr = Vs + Vg0 = 2Vs + 2Vrv \quad (4)$$

For simplification, an example will be described in which the following vehicle 51 is traveling at the same ground speed as the own vehicle 50 in the lane 62 and the relative speed Vrv of the following vehicle 51 with respect to the own vehicle 50 is zero (Vrv=0). By the formula (4), the approaching object speed Vgr is calculated to be twice the own vehicle speed Vs (Vgr=2Vs).

When the own vehicle speed Vs is 20 km/h and 40 km/h, the approaching object speed Vgr is calculated to be 40 km/h and 80 km/h, respectively. The speed Vgr of approximately 40 to 80 km/h is a general speed of a vehicle traveling on a general road. In other words, the probability that the approaching object 55 traveling at 40 to 80 km/h is a vehicle can be estimated to be relatively high.

On the other hand, when the own vehicle speed Vs is 60 km/h, 80 km/h, and 100 km/h, the approaching object speed Vgr is calculated to be 120 km/h, 160 km/h, and 200 km/h, respectively. The speed Vgr of approximately 120 to 200 km/h is not a general speed of a vehicle traveling on a general road. In other words, the probability that the approaching object 55 traveling at 120 to 200 km/h is a vehicle can be estimated to be relatively low.

Based on the above estimate, the own vehicle speed threshold Vc2 is set to a value of approximately 40 to 60 km/h. In accordance with FIG. 4, when Vs<Vc2, specifically, when the own vehicle speed Vs is approximately 20 to 40 km/h, which is low, the probability that a detected approaching object 55 is a vehicle or the like is relatively high, and accordingly, the azimuth difference threshold θc is set to be small. More specifically, the azimuth difference threshold θc is set to the fixed value θc1 which is set to a small value. Thus, priority is placed on reducing the probability that even though the approaching object 55 is a real approaching object, the approaching object 55 is erroneously determined to be a ghost target. When Vs<Vc2, setting the azimuth difference threshold θc to be small particularly allows a particularly low probability that even though the approaching object 55 is, for example, a motorcycle that is approaching the own vehicle 50 while passing through a space between the vehicles, the approaching object 55 is erroneously determined to be a ghost target.

When Vs≥Vc2, specifically, when the own vehicle speed Vs is approximately 60 to 100 km/h, which is high, the probability that a detected approaching object 55 is a vehicle or the like is relatively low, and accordingly, the azimuth difference threshold θc is set to be larger than θc1. Thus, priority is placed on achieving an easy determination in which the approaching object 55 is easily determined to be a ghost target.

Furthermore, when Vs≥Vc2, as shown in FIG. 4, the azimuth difference threshold θc is set to be smaller as the distance R between the own vehicle 50 and the following vehicle 51 becomes larger, and the azimuth difference threshold θc is set to be larger as the distance R becomes smaller.

As shown in FIG. 5, with regard to the following vehicle 51 whose distance from the own vehicle 50 is R1, a maximum azimuth θ1 of the following vehicle 51 with respect to the own vehicle 50 is expressed as an angle A1-O-B1. Furthermore, with regard to a following vehicle 52 whose distance from the own vehicle 50 is R2, a maximum azimuth θ2 of the following vehicle 52 with respect to the own vehicle 50 is expressed as an angle A2-O-B2. The distance R1 is smaller than the distance R2 (R1<R2), and the maximum azimuth θ1 is larger than the maximum azimuth θ2 (θ1>θ2). When a following vehicle is the following vehicle 51 whose distance from the own vehicle 50 is R1, a ghost target is detected at the maximum azimuth θ1 or less. When a following vehicle is the following vehicle 52 whose distance from the own vehicle 50 is R2, a ghost target is detected at the maximum azimuth θ2 or less. As is clear from FIG. 5, as the distance R becomes smaller, a ghost target is detected at a position deviated more from the position of the own vehicle 50 toward the side of the own vehicle 50.

With reference to FIG. 2, when the distance R between the own vehicle 50 and the following vehicle 51 is small, the approaching object 55 is located farther from the lane 62 to the right and detected at a position closer to the lane 63. Thus, the azimuth difference threshold θc is set to be large.

When the distance R between the own vehicle 50 and the following vehicle 51 is large, the approaching object 55 is detected at a position relatively close to the lane 62. Thus, the azimuth difference threshold θc is set to be small so that priority is placed on reducing the probability that even though the approaching object 55 is a real approaching object, the approaching object 55 is erroneously determined to be a ghost target.

The own vehicle speed threshold Vc2, the distance thresholds Rc1 to Rc3, the predetermined fixed values θc1 to θc5 for the azimuth difference threshold θc shown in FIG. 4 can be changed as appropriate according to the lane width, the ground speed of the following vehicle 51, or the like.

Figure 6:
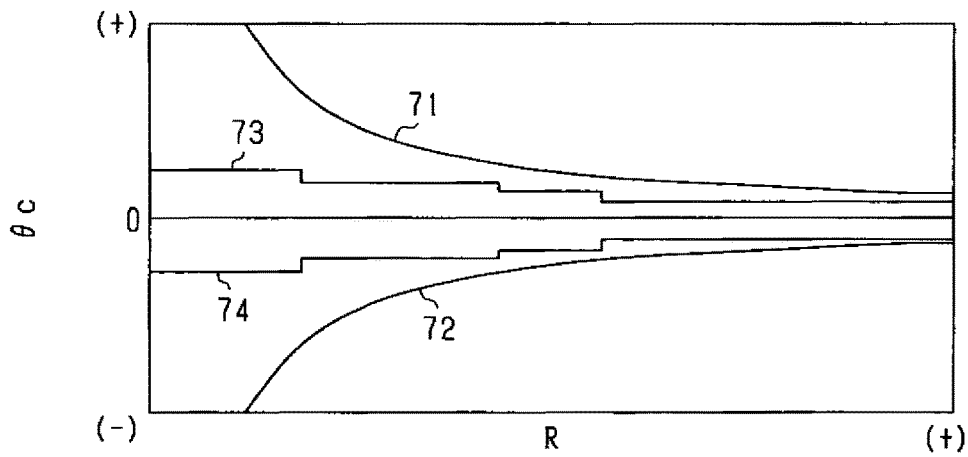
FIG. 6 shows a relationship between the distance R between the following vehicle and the own vehicle and an azimuth difference between the following vehicle and the ghost target.

The distance thresholds Rc1 to Rc3 and the predetermined fixed values θc1 to θc5 for the azimuth difference threshold θc may be set based on actual measured values. For example, with regard to actual measured values acquired from the radar device 11 by the data acquisition unit 21, as shown in FIG. 6, a distribution diagram in which the horizontal axis represents the distance R between the own vehicle 50 and the following vehicle 51 and the vertical axis represents the azimuth difference is prepared by plotting actual measured values of the azimuth difference between the following vehicle 51 and a ghost target detected when the distance between the own vehicle 50 and the following vehicle 51 is R. Based on the distribution diagram, the azimuth difference threshold θc can be set to include a predetermined proportion (e.g., 95%) of the entire set of azimuth differences between the following vehicle and the ghost target.

For example, in FIG. 6, a curve 71 and a curve 72 are obtained so that all the actual measured values are included between the curves 71 and 72. Then, the azimuth difference threshold θc may be set so that θc is reduced as R is increased following the curves 71 and 72. Alternatively, in FIG. 6, a stepped rectangular line 73 and a stepped rectangular line 74 may be obtained so that a predetermined proportion (e.g., 95%) of actual measured values are included between the stepped lines 73 and 74. Then, the azimuth difference threshold θc may be set so that θc is reduced stepwise as R is increased following the rectangular lines 73 and 74. The proportion of actual measured values may be changed based on the surrounding environment in which the own vehicle 50 travels, the traveling state of the own vehicle 50, or the like.

The above thresholds may be stored in the ECU 20 as they are or in the form of a mathematical formula, a data table, or the like.

The assistance determination unit 23 performs driving assistance of the own vehicle 50 for danger avoidance of the own vehicle 50 from a target object and excludes, from the target object, an approaching object determined to be a ghost target by the ghost determination unit 40. Even in the case where an approaching object 55 is detected by the object detection unit 22, when the approaching object 55 is determined to be a ghost target by the ghost determination unit 40, the approaching object 55 does not hinder traveling safety of the own vehicle 50. Thus, the assistance determination unit 23 does not perform driving assistance such as notification, avoidance of a collision, or reduction in damage for the approaching object 55. When an approaching object 55 is detected by the object detection unit 22 and the approaching object 55 is determined not to be a ghost target by the ghost determination unit 40, the approaching object 55 may hinder traveling safety of the own vehicle 50. Thus, the assistance determination unit 23 performs driving assistance such as notification, avoidance of a collision, or reduction in damage for the approaching object 55. For example, a control command to emit an alarm sound is outputted to the alarm device 30.

Figure 7:
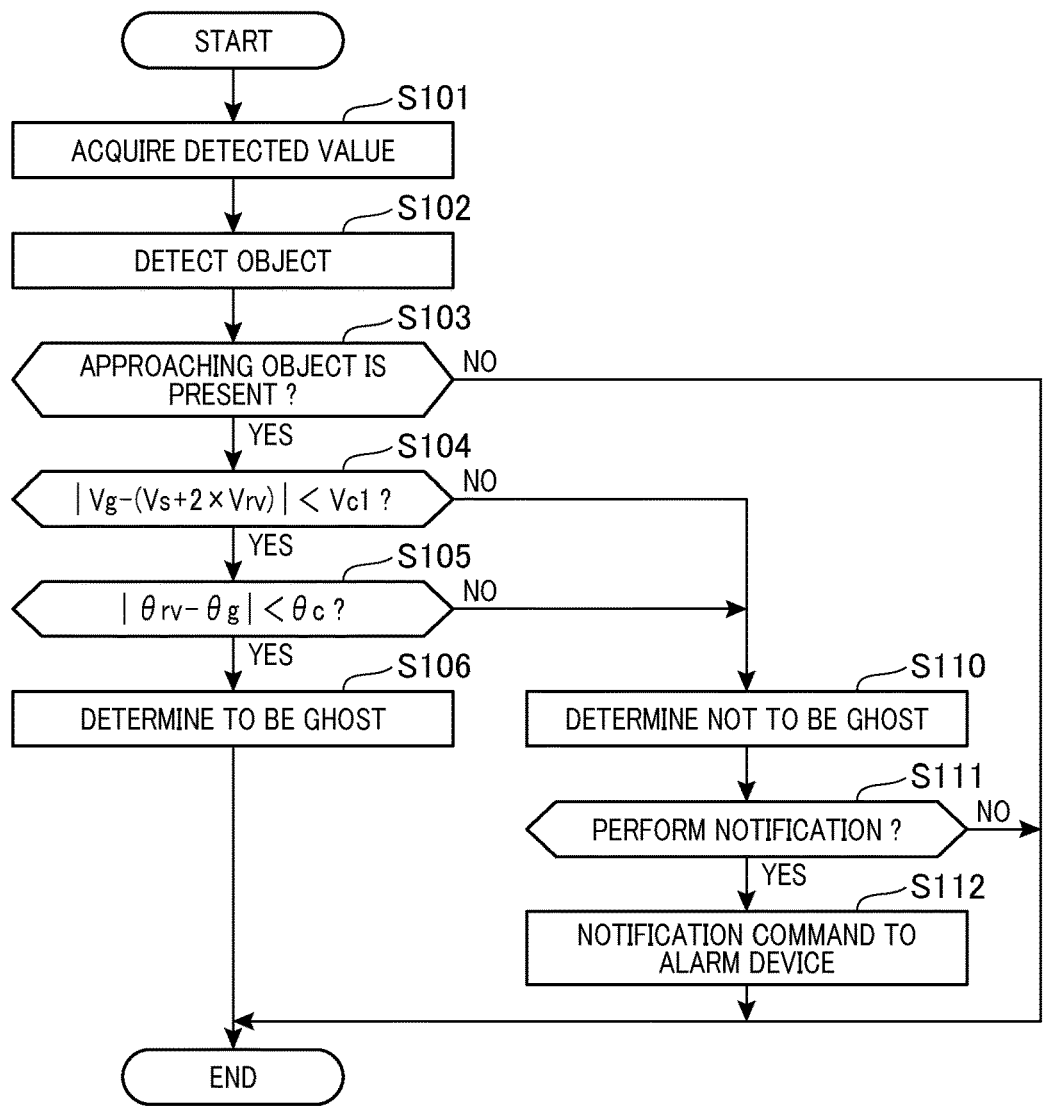
FIG. 7 is a flow chart of a driving assistance process according to the embodiment.

A driving assistance process performed by the ECU 20 will be described with reference to FIG. 7. The ECU 20 repeatedly performs the driving assistance process shown in FIG. 7 in a predetermined cycle while the own vehicle is traveling.

First, as shown at step S101, the ECU 20 acquires detection information such as the own vehicle speed Vs and a relative speed and an azimuth of an object behind the own vehicle with respect to the own vehicle from various sensors such as the radar device 11 and the vehicle speed sensor 12. Then, control proceeds to step S102.

At step S102, based on the detection information acquired from the radar device 11, an object that is present behind the own vehicle is detected. A type of the object is not particularly limited and may include any of a vehicle, a bicycle, a motorcycle, a pedestrian, an animal, a structure, and the like. Then, control proceeds to step S103.

At step S103, it is determined whether the objects detected at step S102 include an approaching object that is approaching the own vehicle. Specifically, for example, when a relative speed of an object with respect to the own vehicle is more than or equal to a predetermined approaching speed threshold, it is determined that the object is an approaching object. When an approaching object is present (i.e., when an approaching object is detected), control proceeds to step S104. When no approaching object is present (i.e., when no approaching object is detected), the process is ended.

At step S104, it is determined whether a speed condition is satisfied. Specifically, by using the relative speed Vg and the relative speed Vrv acquired from the radar device 11 and the own vehicle speed Vs acquired from the vehicle speed sensor 12, it is determined whether a speed condition shown in the following formula (5) is satisfied. The speed difference threshold Vc1 is set in advance and stored in the ECU 20, for example, by using the frequency distribution diagram in FIG. 3. When it is determined that the speed condition is satisfied, control proceeds to step S105. When it is determined that the speed condition is not satisfied, control proceeds to step S110.

$$|Vg-(Vs+2Vrv)|<Vc1 \quad (5)$$

At step S105, it is determined whether an azimuth condition is satisfied. Specifically, based on the azimuth θrv of the following vehicle and the azimuth θg of the approaching object that are acquired from the radar device 11, it is determined whether an azimuth condition shown in the following formula (6) is satisfied. The data table shown in FIG. 4 is stored in advance in the ECU 20. By using the own vehicle speed Vs acquired at step S101 and the distance R between the own vehicle and the following vehicle, the azimuth difference threshold θc is calculated from the data table stored in the ECU 20. When it is determined that the azimuth condition is satisfied, control proceeds to step S106. When it is determined that the azimuth condition is not satisfied, control proceeds to step S110.

$$|θrv-θg|<θc \quad (6)$$

At step S106, it is determined whether the approaching object approaching the own vehicle recognized at step S103 is a ghost. When both the speed condition shown at step S104 and the azimuth condition shown at step S105 are satisfied, it is determined that the approaching object is a ghost. As a result, the approaching object recognized at step S103 is excluded from being an object for which driving assistance for danger avoidance of the own vehicle is to be performed, and no notification command to the alarm device 30 is outputted.

At step S110, it is determined that the approaching object approaching the own vehicle recognized at step S103 is not a ghost. When at least one of the speed condition shown at step S104 and the azimuth condition shown at step S105 is not satisfied, it is determined that the approaching object is not a ghost. Then, control proceeds to step S111.

At step S111, the approaching object recognized at step S103 is recognized as an object for which driving assistance for danger avoidance of the own vehicle is to be performed, and it is determined whether to perform notification. The determination of whether to perform notification may be, for example, a determination of whether the approaching object has entered a notification region that is set behind the own vehicle. In this case, when it is determined that the approaching object has entered the notification region, it is determined that notification is to be performed, and control proceeds to step S112. At step S112, a notification command is outputted to the alarm device 30, and the process is ended. On the other hand, when it is determined at step S111 that no notification is to be performed, the process is ended at the point.

As described above, according to the present embodiment, it is determined that an approaching object is a ghost target based on both the speed condition and the azimuth condition. Thus, it is possible to distinguish an actual approaching object and a ghost object with higher accuracy.

The above embodiment can achieve the following advantageous effects.

The ECU 20 includes the object detection unit 22, the data acquisition unit 21, the ghost determination unit 40, and the assistance determination unit 23. The object detection unit 22 detects an object behind the own vehicle 50 by using reflected waves resulting from search waves transmitted from the radar device 11 or the like, and recognizes an object that is approaching the own vehicle 50 as an approaching object 55. The data acquisition unit 21 acquires the own vehicle speed Vs, and a relative speed and an azimuth of the object detected by the object detection unit 22 with respect to the own vehicle 50. The ghost determination unit 40 determines whether the approaching object 55 is a ghost target that is not actually present. The assistance determination unit 23 performs driving assistance of the own vehicle 50 for danger avoidance of the own vehicle 50 from a target object, and excludes, from the target object, the approaching object 55 determined to be a ghost target by the ghost determination unit 40.

The ghost determination unit 40 includes the speed determination unit 41 and the azimuth determination unit 42. Based on the own vehicle speed Vs, and the relative speed Vrv of the following vehicle 51, which is located between the own vehicle 50 and the approaching object 55, with respect to the own vehicle 50, the speed determination unit 41 calculates the calculated value Vg0 of the relative speed of the approaching object 55 with respect to the own vehicle 50. Furthermore, the speed determination unit 41 calculates, as the speed difference dVg, an absolute difference between the detected value Vg of the relative speed of the approaching object 55 with respect to the own vehicle 50 that is acquired by the data acquisition unit 21 and the calculated value Vg0. Based on the azimuth θrv of the following vehicle 51 and the azimuth θg of the approaching object 55 that are acquired by the data acquisition unit 21, the azimuth determination unit 42 calculates, as the azimuth difference dθg, an absolute difference between the azimuth of the following vehicle 51 with respect to the own vehicle 50 and the azimuth of the approaching object 55 with respect to the own vehicle 50. Then, based on both the speed difference dVg and the azimuth difference dθg, the ghost determination unit 40 determines whether the approaching object 55 is a ghost target. The ghost determination unit 40 can determine whether the approaching object 55 is a ghost target based on the speed difference dVg and the azimuth difference dθg calculated by respectively using the relative speed Vg and the azimuth θg of the detected approaching object 55, and the relative speed Vg0 and the azimuth θrv of the approaching object 55 that are theoretically obtained by assuming that the approaching object 55 is a ghost target. Thus, it is possible to distinguish between an actual approaching object and a ghost object with higher accuracy.

When it is determined that the speed difference dVg satisfies the speed condition and the azimuth difference dθg satisfies the azimuth condition, the ghost determination unit 40 may determine that the approaching object 55 is a ghost target. Specifically, the speed determination unit 41 may set the speed condition to be a condition that the speed difference dVg is less than the predetermined speed difference threshold Vc1. Furthermore, the azimuth determination unit 42 may set the azimuth condition to be a condition that the azimuth difference dθg is less than the predetermined azimuth difference threshold θc. Then, when the speed determination unit 41 makes an affirmative determination that the speed condition is satisfied and the azimuth determination unit 42 makes an affirmative determination that the azimuth condition is satisfied, the ghost determination unit 40 may determine that the approaching object 55 is a ghost target. By setting the speed difference threshold Vc1 and the azimuth difference threshold θc according to the situation of the own vehicle 50 and the surroundings of the own vehicle 50, an accurate determination can be simply made.

The azimuth determination unit 42 may determine whether the own vehicle speed Vs is less than the predetermined own vehicle speed threshold Vc2. When the own vehicle speed Vs is less than the predetermined own vehicle speed threshold Vc2, the azimuth determination unit 42 may set the azimuth difference threshold θc to the predetermined fixed value θc1. When the own vehicle speed Vs is more than or equal to the predetermined own vehicle speed threshold Vc2, based on the distance R between the own vehicle 50 and the following vehicle 51, the azimuth determination unit 42 may change the azimuth difference threshold θc within a range that is larger than the predetermined fixed value θc1, for example, as shown in FIGS. 4 and 6. The speed condition and the azimuth condition can be adjusted based on the estimated ground speed Vgr and position of the approaching object 55; thus, it is possible to successfully adjust the trade-off relationship between ease of detection of a ghost target and prevention of an erroneous determination in which a real approaching object is erroneously determined to be a ghost target.

The present disclosure has been described in accordance with the embodiments, but it is understood that the present disclosure is not limited to the embodiments or structures. The present disclosure encompasses various modifications and variations in an equivalent range. In addition, the scope and spirit of the present disclosure encompass various combinations or forms and other combinations or forms including only one element, one or more elements, or one or less elements.

What is claimed is:

1. A driving assistance device comprising:
   an object detection unit that detects one or more objects behind an own vehicle by using a reflected wave resulting from a search wave, and recognizes, in the detected one or more objects, an object that is approaching the own vehicle as an approaching object;
   an acquisition unit that acquires a speed of the own vehicle, and a relative speed and an azimuth of each of the one or more objects detected by the object detection unit with respect to the own vehicle;
   a ghost determination unit that determines whether the approaching object is a ghost target that is not actually present; and
   an assistance determination unit that performs driving assistance of the own vehicle for danger avoidance of the own vehicle from a target object, and excludes, from the target object, the approaching object determined to be the ghost target by the ghost determination unit, wherein
   the acquisition unit is configured to acquire a first value of the relative speed of the approaching object with respect to the own vehicle;
   the ghost determination unit is configured to:
   calculate a second value of the relative speed of the approaching object with respect to the own vehicle in accordance with the speed of the own vehicle and a value of the relative speed of a following object with respect to the own vehicle, the following object being detected by the object detection unit and being located between the own vehicle and the approaching object;
   calculate, as a speed difference, an absolute difference between the first value of the relative speed of the approaching object and the second value of the relative speed of the approaching object;
   calculate, as an azimuth difference, an absolute difference between an azimuth of the following object and an azimuth of the approaching object acquired by the acquisition unit; and
   determine whether the approaching object is the ghost target based on the speed difference and the azimuth difference.

2. The driving assistance device according to claim 1, wherein:
   the ghost determination unit includes:
   a speed determination unit that determines whether the speed difference is less than a predetermined speed difference threshold; and
   an azimuth determination unit that determines whether the azimuth difference is less than a predetermined azimuth difference threshold,
   the ghost determination unit being configured to determine that the approaching object is the ghost target in response to both:
   the speed difference being determined to be less than the predetermined speed difference threshold; and
   the azimuth difference being determined to be less than the predetermined azimuth difference threshold.

3. The driving assistance device according to claim 2, wherein
   the azimuth determination unit is configured to:
   determine whether the speed of the own vehicle is less than a predetermined own-vehicle speed threshold;
   set the azimuth difference threshold to a predetermined fixed value in response to determination that the speed of the own vehicle is less than the predetermined own-vehicle speed threshold; and
   change, based on a distance between the own vehicle and the following object, the azimuth difference threshold within a range that is larger than the predetermined fixed value in response to determination that the speed of the own vehicle is more than or equal to the predetermined own-vehicle speed threshold.

4. The driving assistance device according to claim 3, wherein
   the azimuth determination unit is configured to:
   change the azimuth difference threshold to be smaller as the distance between the own vehicle and the following object becomes larger in response to determination that the speed of the own vehicle is more than or equal to the predetermined own-vehicle speed threshold.

* * * * *